UNITED STATES PATENT OFFICE.

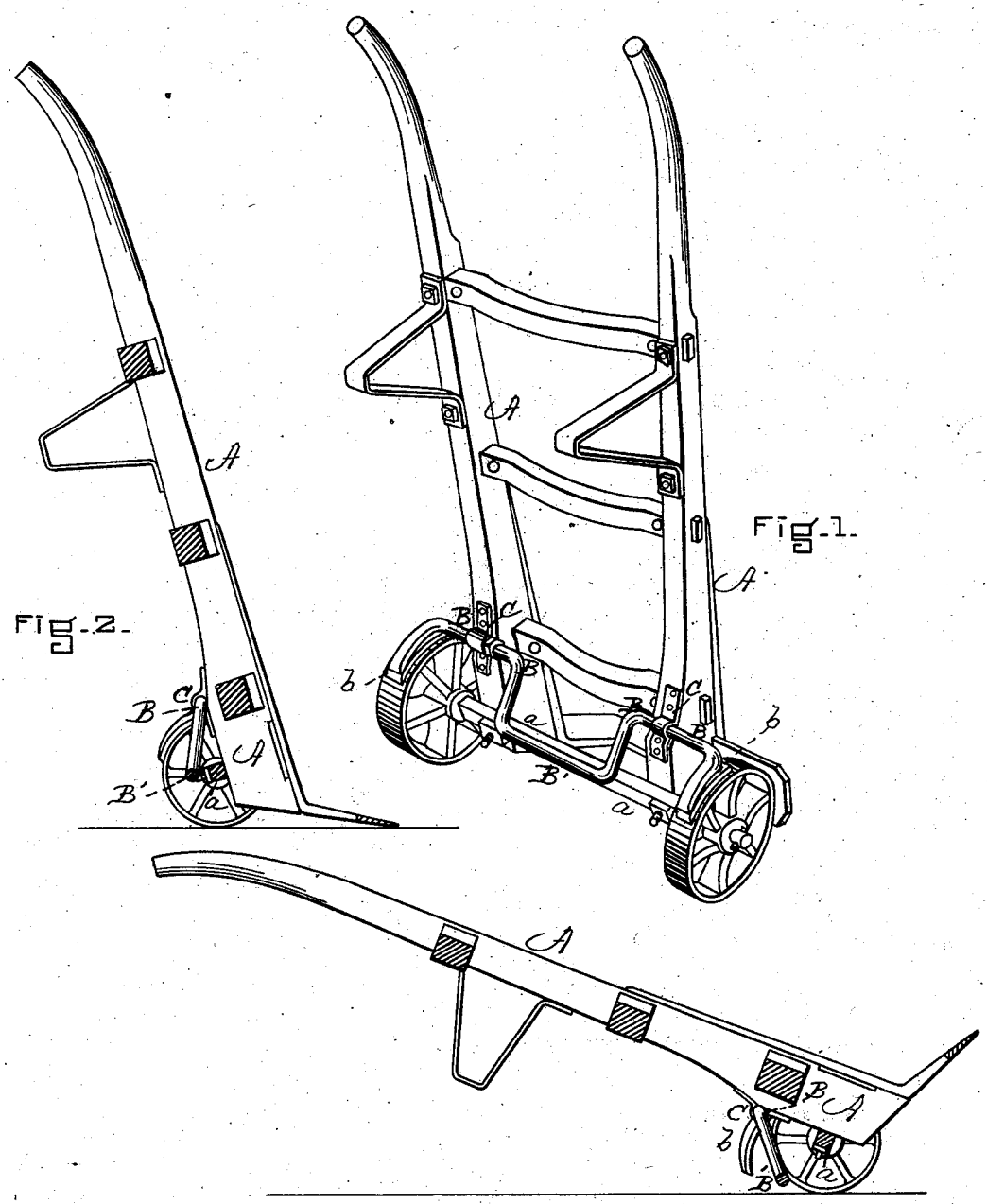

JOHN BURLEIGH AND JAMES GARDNER ABBOTT, OF LAWRENCE, MASS.

HAND-TRUCK.

SPECIFICATION forming part of Letters Patent No. 292,790, dated February 5, 1884.

Application filed August 24, 1883. (No model.)

*To all whom it may concern:*

Be it known that we, JOHN BURLEIGH and JAMES GARDNER ABBOTT, both of Lawrence, in the county of Essex and State of Massachusetts, have invented a new and useful Improvement in Hand-Trucks, of which the following is a specification.

This improvement relates to hand-trucks such as are in use in stores, upon wharves, in railway-stations, and other places for moving trunks, cases, barrels, and other merchandise.

It has been found that as the merchandise is tipped upon the truck the latter is apt to move or flinch or run back and injure the operator of the truck, who usually braces himself by placing one foot on the axle. Injury to the foot is very common, as the toe of the boot is usually placed upon the axle and the heel on the ground. The tendency is for the truck to run back and squeeze the foot. This invention provides a brake, which has a bar so hung that the foot is naturally placed upon it instead of on the axle, thus holding the truck firmly by braking the wheels and at the same time providing means for bracing.

In the accompanying drawings, in which similar letters of reference indicate like parts, Figure 1 is a perspective view of a hand-truck, with our improvement attached, in the position assumed when being loaded. Fig. 2 is a longitudinal section of the same in the same position. Fig. 3 is a longitudinal section in the position assumed when being drawn.

A represents the frame of the truck. When the truck is being loaded, as in Figs. 1 and 2, the foot is pressed upon the axle $a$ in the endeavor to hold it steady. The improvement consists of the brake shown, and comprising the swinging bar B, dropped centrally at B', secured loosely to the frame at C, and provided with the brake-shoes $b$. The bar B is so bent and the relative angles of the portions B' and $b$ are such that when the truck is in the position shown in Figs. 1 and 2 (i. e., ready to be loaded) the brake-shoes $b$ lie on the wheels, and as the user places his foot on the dropped portion B' to brace himself against the load he presses the brake hard against the wheels, and the truck remains stationary as the load is tipped upon it, neither turning nor running back. As soon as it is loaded the user naturally drops it into the position shown in Fig. 3, when the brake-shoes $b$ drop by gravity away from the wheels, as seen in said figure. Care is had to make the dropped portion B' short enough to clear the ground.

It will be observed that provision is made to accommodate the foot as well as the axle, but that this pressure of the foot applies the brake without any extra movement or exertion.

Having thus fully described our invention, what we claim, and desire to secure by Letters Patent, is—

In a hand-truck, the combination, with the frame thereof, of the bent bar B, swung at C from said frame, and provided with the dropped portion B', and brake-shoes $b$, constructed and arranged substantially as and for the purpose set forth.

JOHN BURLEIGH.
JAMES GARDNER ABBOTT.

Witnesses:
ARETAS R. SANBORN,
JOHN C. SANBORN.